United States Patent [19]

Beck et al.

[11] 4,251,924
[45] Feb. 24, 1981

[54] REMOVING RESIDUAL DAMPNESS FROM AN ADSORPTION CELL

[76] Inventors: Rolf Beck, Farnern 47, 3624 Goldiwil, Switzerland; Martin Zimmermann, Schwachhauser Heerstr. 311, 2800 Bremen; Martin Schumacher, Bucheneck 10, 2819 Nordwohlde, both of Fed. Rep. of Germany

[21] Appl. No.: 19,267

[22] Filed: Mar. 9, 1979

[30] Foreign Application Priority Data

Aug. 24, 1978 [CH] Switzerland .................. 8969/78

[51] Int. Cl.³ .................. F26B 3/06; F26B 19/00
[52] U.S. Cl. .................. 34/22; 34/75; 34/80; 34/35; 34/86; 55/59; 55/62; 55/196; 55/198
[58] Field of Search .................. 34/22, 27, 35, 80, 81, 34/85, 86, 75; 8/142; 55/62, 54, 196, 198, 268

[56] References Cited

U.S. PATENT DOCUMENTS

| 1,418,363 | 6/1922 | Coggeshall et al. | 34/80 X |
| 1,453,215 | 4/1923 | Voress et al. | 55/59 X |
| 2,330,655 | 9/1943 | Zucker | 34/80 |
| 2,428,885 | 10/1947 | Luaces | 55/59 X |
| 2,656,696 | 10/1953 | McDonald | 8/142 X |
| 2,660,869 | 12/1953 | McDonald | 8/142 X |
| 2,681,512 | 6/1954 | Armstrong | 34/75 X |
| 2,746,168 | 5/1956 | Rickabaugh | 34/75 X |
| 2,910,137 | 10/1959 | Victor | 8/142 X |
| 3,095,284 | 6/1963 | Victor | 34/80 |
| 3,728,074 | 4/1973 | Victor | 34/80 X |
| 4,021,211 | 5/1977 | Turek et al. | 55/59 X |

FOREIGN PATENT DOCUMENTS 593359 10/1947 United Kingdom .................. 55/62

*Primary Examiner*—Albert J. Makay
*Assistant Examiner*—Harold Joyce
*Attorney, Agent, or Firm*—Charles Hieken

[57] ABSTRACT

The drying medium (T) is driven through the adsorbent (5) of the adsorption cell (1) in the same direction as the process medium (P). Initially it is ejected through an auxiliary output (19) and a device (26) for removal of dampness and then is changed-over towards a main output (18) and preferably into the workroom (A).

8 Claims, 1 Drawing Figure

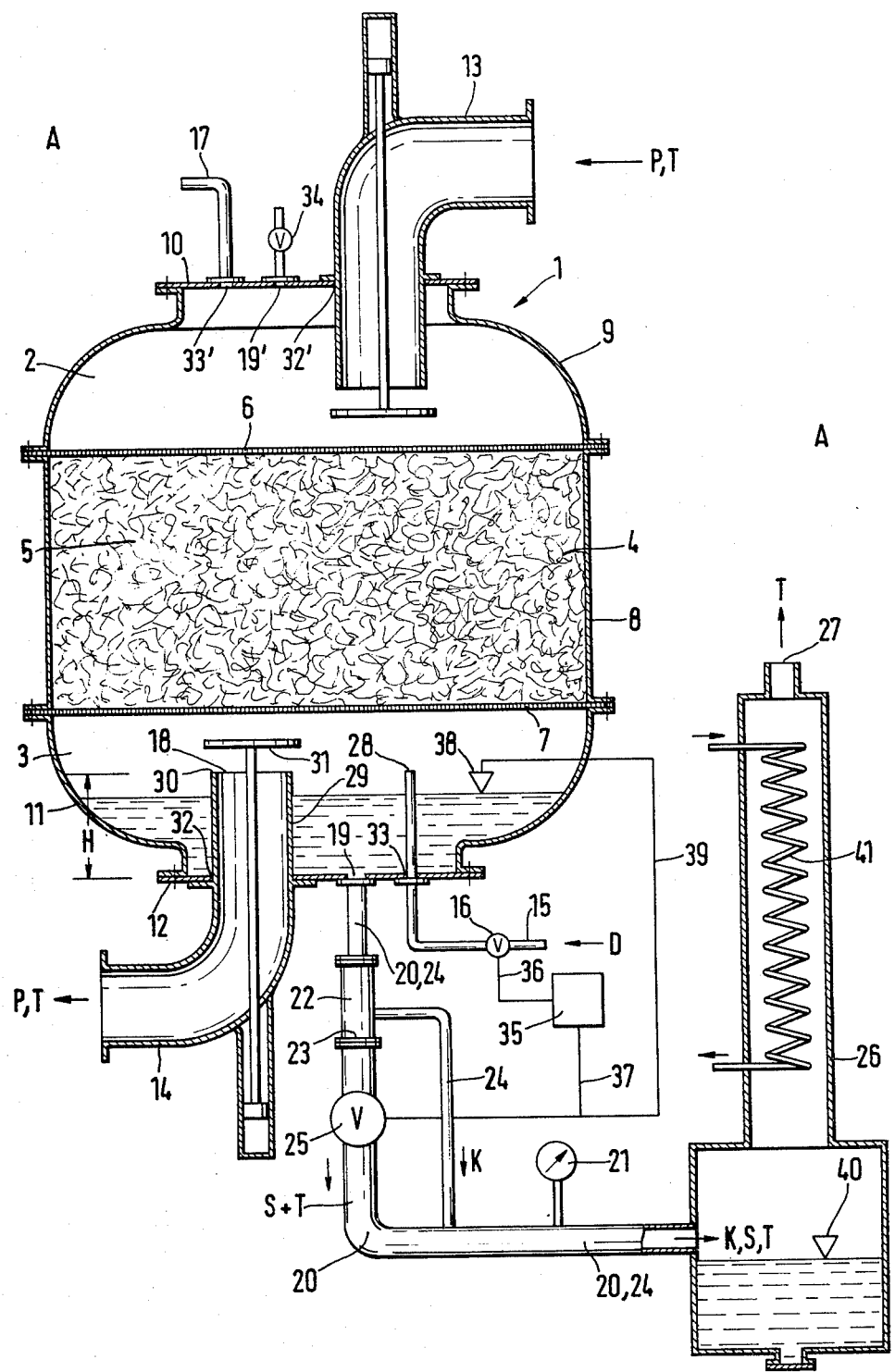

REMOVING RESIDUAL DAMPNESS FROM AN ADSORPTION CELL

The invention relates to a method for the removal of the residual dampness from an adsorption cell after desorption by water vapor by help of a drying medium.

STATE OF ART

It is conventional practice to eject the output air stream of adsorption cells into the open air.

PROBLEM

It is the main object of the present invention to improve the removal of the residual dampness in such a manner that it is possible to avoid an ejection of the output air of adsorption cells into the free air. It is another object to improve the clearance of the mud filter which usually is provided within the condensate output of adsorption cells.

SOLUTION OF THE PROBLEM

According to the present invention the drying medium is driven through the adsorbent in the same direction previously followed by the process medium and that initially, namely during a first drying phase or interval, it is driven through an auxiliary first outlet and during a second phase or interval, namely after having caused a diminished dampness, it is driven through a second (main) outlet. Thus most of the residual dampness can be kept away from the main air output. This makes it possible to avoid an ejection into the open air and to eject the output with its heat energy into the workroom or into other rooms.

Preferably said auxiliary outlet is combined with the condensate outlet. This condensate outlet can be connected to a mud filter the mud outlet of which is connected to a mud pipe with a mud valve. This makes it possible to remove the mud in a simple manner. The mud valve is opened intermittently, thus clearing the filter by a stream of accumulated condensate during the first interval of the drying process by the drying medium.

It is preferred to provide the main outlet with a collar extending through and high enough above the bottom of the adsorber in order to obtain an amount of accumulated condensate sufficient to ensure a good clearance of the mud filter.

BRIEF DESCRIPTION OF THE DRAWING

The drawing shows a diagrammatic representation of a system according to the invention.

DESCRIPTION OF EMBODIMENT

The adsorption cell 1 shown in the drawing consists of an adsorption chamber 4 filled with an adsorbent 5 such as active carbon and arranged between an upper or top chamber 2 and a bottom chamber 3. The adsorbent chamber is formed by a cylindrical wall 8 and apertured discs or screens 6 and 7. The chambers 2 and 3 are formed by walls 9,11, a cover plate 10 and bottom plate 12.

The adsorption cell predominantly is utilized for the adsorption of solvent vapors from air in an adsorption interval and for the recovering of the solvent by desorption with help of water vapor in a desorption interval.

The water vapor D enters the bottom chamber 3 over a feed line 15 and steam valve 16 and after transit of the adsorbent leaves the top chamber 2 together with solvent vapor into an offtake line 17 which is connected to a device for separation of water vapor and solvent vapor.

The residual dampness remaining in the cell 1 then is removed with the aid of a drying medium T admitted through switch means (not shown in the drawing) driven through the same valve 13 through which the process medium P previously passed. There are two separate outlets 18 and 19 for the residual dampness and the drying medium T, namely an auxiliary first outlet 19 (bottom opening) and a main second outlet 18, the opening of valve 14.

The auxiliary outlet 19 is important to avoid disturbances by the high dampness which is present at the beginning of the drying process. For the sake of this high dampness the drying medium T and consequently also the process medium during the adsorption interval hitherto have been ejected into the free air, thereby resulting in a high loss of heat energy. Most of this loss could be avoided by a first shorttime auxiliary output through opening 19 into the open air and by a following output through opening 18 into the workroom A.

Change-over from output 19 to output 18 may be performed automatically by a change-over signal from a hygrometer 21 which is connected to the auxiliary line 20.

A mud or sediment filter 22 for the condensate is also connected to outlet 19 or condensate outlet 24. The auxiliary line 20 extends from the mud outlet opening 23 of filter 22 over an intermittently operated mud valve 25 to a device 26 for steam removal. Condensate K will be accumulated above opening 19 due to an accumulation of mud S above valve 25 and on opening valve 25 will operate like the water from a flush tank thus, clearing filter 22.

The device for removal of residual dampness or steam consists of a tower-like condenser and is provided with a top output 27 through which the medium may enter the workroom A. The auxiliary line 20 is connected to device 26 above the condensate level 40 in order to separate mud by settling.

The desired operation of change-over to output 18 may be controlled by an additional hygrometer at the main outlet.

The main outlet 18 is also outlet for the process medium P and is arranged with a distance H above bottom 12, just as the inlet 28 for water vapor D. Thus, the volume beneath 18 and 40 operates like the liquid of a flush tank.

The main outlet 18 for the process medium P and drying medium T is provided with a collar 29 extending through and above the bottom 12 of the bottom chamber 3. The rim of the collar 29 forms a seat 30 for the disc 31 of valve 14. The bottom plate 12 is provided with openings 19,32,33 for the connection of all pipes to be connected to the bottom chamber 3 included said auxiliary outlet 20. Bottom plates 12 and cover plate 10 with their openings 19,32,33 and 19', 32', 33' and also valves 13 and 14 are exchangeable. A safety valve 34 is connected to opening 19'.

Mud valve 25 may be operated by a timer 35 which can be turned on and off by steam valve 16 and may control mud valve 25 over a control line 37. Simultaneously mud valve 25 may be controlled by level sensor 38 over a control line 39.

The condensate level in chamber 3 is maintained beneath openings 18 and 28 by said level sensor 38.

Negative pressure is produced within device 26 by condensation and will help to suck off dampness from cell 1. At the end of the drying process cell 1 may once more be switched over to adsorption.

The drying medium T (after change-over to main outlet 18) as well as the process medium P leaving outlet 18 may be used for special purposes, as for instance a medium in a chemical dry cleaning machine. The drying medium could also be driven through an auxiliary output which is independent of the condensate outlet.

The cleaning of the mud filter as described above could also be used in connection with adsorption cells without auxiliary outlet and steam removal device. This cleaning is practicable not only during the drying but also during the desorption interval and at some other time. It can also be used in connection with cells the adsorbent chamber of which is arranged side by side between output and input chambers.

There has been described novel apparatus and techniques for removing the residual dampness of adsorption cells to reduce pollution while advantageously flushing sediment from a mud or sediment filter. It is evident that those skilled in the art may now make numerous uses and modifications of and departures from the specific apparatus and techniques disclosed herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Method for the removal of the residual dampness from an adsorption cell having adsorbent through which processing medium passes in a processing direction and at least an auxiliary first outlet and main second outlet after desorption by water vapor with a drying medium comprising the steps of
   driving the drying medium through the adsorbent in said processing direction and
   initially during a first drying phase or interval through an auxiliary first outlet while during a second phase or interval after having caused a diminished dampness through a main second outlet to prevent most of the residual dampness from exiting through said main second outlet.

2. Device for the removal of the residual dampness from an adsorption cell having adsorbent through which processing medium passes in a processing direction and at least an auxiliary first outlet and main second outlet after desorption by water vapor with a drying medium comprising said adsorption cell including an adsorption chamber arranged between two chambers for the inlet and outlet of a process medium during an adsorption interval, of water vapor during a following desorption interval and a drying medium during a following drying interval, said device further comprising
   means for opening said auxiliary first outlet for the drying medium during a first drying interval before opening said main second outlet for the drying medium during a second interval to prevent most of the residual dampness from exiting through said main second outlet.

3. Device as defined in claim 2 and further comprising,
   means for removal of vapor,
   and an auxiliary pipe connecting said auxiliary first outlet to said means for removal.

4. Device as defined in claim 3 wherein said auxiliary first outlet is at the bottom of said adsorption cell and comprises means for draining condensate therefrom.

5. Device as defined in claim 3 and further comprising a mud filter having a mud outlet opening connected in said auxiliary pipe with a mud valve and to said first auxiliary outlet to facilitate clearance of said mud filter.

6. Device as defined in any one of the claims 2 to 5, wherein said main second outlet has a collar extending through and above the bottom of said adsorption cell.

7. Device as defined in claim 2 wherein said adsorption cell has a bottom chamber with bottom plate provided with openings for the connection of all pipes to be connected to the bottom chamber including said auxiliary first outlet.

8. Device as defined in claim 7 wherein said adsorption cell includes a cover plate having openings and interchangeable with said bottom plate.

* * * * *